(12) United States Patent
Murai et al.

(10) Patent No.: US 7,083,667 B2
(45) Date of Patent: Aug. 1, 2006

(54) COLORANT COMPOUND, INK, INK TANK, RECORDING UNIT, RECORDING APPARATUS AND RECORDING PROCESS

(75) Inventors: Yasuaki Murai, Kawasaki (JP); Takayuki Toyoda, Yokohama (JP); Takeshi Miyazaki, Yokohama (JP); Yuko Yamagishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 11/053,267

(22) Filed: Feb. 9, 2005

(65) Prior Publication Data

US 2005/0178289 A1    Aug. 18, 2005

(30) Foreign Application Priority Data

Feb. 13, 2004    (JP) ............................. 2004-037286
Jan. 24, 2005    (JP) ............................. 2005-015018

(51) Int. Cl.
*C09D 11/02* (2006.01)
*C07D 311/88* (2006.01)

(52) U.S. Cl. .................... 106/31.43; 106/31.75; 549/225; 549/227

(58) Field of Classification Search ............ 106/31.43, 106/31.75; 549/225, 227; 347/100
See application file for complete search history.

(56) References Cited

U.S. PATENT DOCUMENTS

| | | | | |
|---|---|---|---|---|
| 3,708,499 A * | 1/1973 | Andree et al. | .............. | 549/227 |
| 4,711,832 A * | 12/1987 | Gruenbaum et al. | ... | 430/108.21 |
| 4,895,961 A * | 1/1990 | Schmeidl | .................... | 549/227 |
| 5,279,656 A * | 1/1994 | Kenyon et al. | .......... | 106/31.43 |
| 5,514,208 A * | 5/1996 | Nagai et al. | ............. | 106/31.43 |
| 6,756,423 B1 | 6/2004 | Ishizuka et al. | ............ | 523/160 |
| 2004/0009294 A1 | 1/2004 | Kuribayashi et al. | ...... | 106/31.6 |

(Continued)

FOREIGN PATENT DOCUMENTS

DE    416618    9/1925

(Continued)

OTHER PUBLICATIONS

Derwent abstract of JP02-213854, Aug. 1990.*

*Primary Examiner*—Helene Klemanski
(74) *Attorney, Agent, or Firm*—Fitzpatrick, Cella, Harper & Scinto

(57) ABSTRACT

Disclosed herein is a colorant compound represented by the following general formula (1):

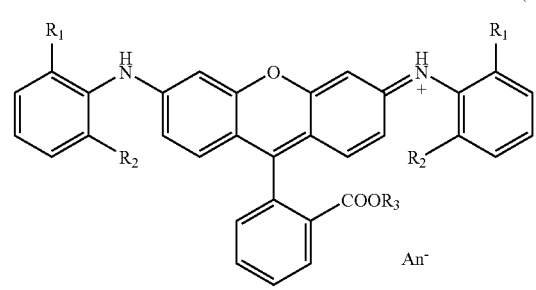

wherein $R_1$ and $R_2$ are the same or different from each other and denote a linear alkyl group having 1 to 4 carbon atoms, $R_3$ is an alkyl group having 1 to 6 carbon atoms, and $An^-$ is a counter anion, an ink comprising the colorant compound, and an ink tank, a recording unit, a recording apparatus and a recording process comprising or using the ink.

15 Claims, 4 Drawing Sheets

U.S. PATENT DOCUMENTS

| | | | |
|---|---|---|---|
| 2004/0244642 A1 | 12/2004 | Uji et al. | 106/31.28 |
| 2004/0261657 A1* | 12/2004 | Wu et al. | 106/31.29 |
| 2005/0016417 A1* | 1/2005 | Wu et al. | 106/31.29 |
| 2005/0188894 A1* | 9/2005 | Yamagishi et al. | 106/31.43 |

FOREIGN PATENT DOCUMENTS

| | | | |
|---|---|---|---|
| DE | 3531272 | | 3/1987 |
| EP | 0 248 176 | | 12/1987 |
| GB | 1 445 989 | | 8/1976 |
| GB | 2 098 622 | | 11/1982 |
| GB | 2 311 075 | | 9/1997 |
| JP | 02-213854 | * | 8/1990 |
| JP | 3-263524 | | 11/1991 |
| JP | 09-255882 | | 9/1997 |
| JP | 9-255882 | | 9/1997 |
| JP | 2001-11347 | | 1/2001 |
| JP | 2001-240763 | | 9/2001 |
| JP | 2003-286433 | | 10/2003 |
| JP | 2003-306624 | | 10/2003 |
| JP | 2003-327885 | | 11/2003 |
| JP | 2003-335986 | | 11/2003 |

* cited by examiner

COLORANT COMPOUND, INK, INK TANK, RECORDING UNIT, RECORDING APPARATUS AND RECORDING PROCESS

BACKGROUND OF THE INVENTION

1. Field of the Invention

The present invention relates to a novel colorant compound, an ink comprising the compound, and an ink tank, a recording unit, a recording apparatus and a recording process comprising or using this ink.

2. Related Background Art

With the life-style change due to the progress of science and technology, colorants have come to be used not only for dying or coloring various materials such as fibers, plastics and leather heretofore, but also in various industrial fields making good use of their properties of recording or displaying information. In particular, with the rapid spread of personal computers in recent years, the hard copy technology typified by ink-jet printing has been advanced for recording characters and image information outputted from the computers.

Water-soluble dyes are generally used as colorants for ink-jet inks. However, recorded images formed by inks containing water-soluble dyes have been poor in water fastness and involved a problem that bleeding of dyes easily occurs at recorded areas when water is spilled thereon, though improvement has been gradually made. On the contrary, images excellent in water fastness can be formed by inks using a pigment as a colorant, so that a great number of recording liquids (inks) obtained by dispersing a pigment in an aqueous medium have been developed for the purpose of improving the water fastness of ink images formed (see, for example, Japanese Patent Application Laid-Open Nos. 2003-286433, 2003-306624, 2003-327885 and 2003-335986). However, images formed by printing with inks using a pigment as a colorant are excellent in water fastness, but have involved another problem that color reproduction quality and transparency of the images are poor compared with the case of inks using dyes because they tend to cause light scattering by the influence of pigment particles.

In order to solve these problems and make it possible to form images satisfying water fastness while retaining excellent color reproducibility and transparency in images obtained by using water-soluble dyes as colorants for inks, processes for obtaining an ink by coloring a water-dispersible resin with an oil-soluble dye have been proposed (see, for example, Japanese Patent Application Laid-Open Nos. 2001-11347 and 2001-240763).

However, the oil-soluble dyes heretofore used in the above-described processes are not sufficient in hue as a magenta color, and there is thus a strong demand for development of colorants having an excellent magenta color for the purpose of forming images of higher image quality.

Here, xanthene dyes and pigments are known as magenta colorants. Since the xanthene colorants generally have 2 absorption bands (x-band and y-band) in the visible region, the complementary colors of the x-band on a longer wavelength side and the y-band on a shorter wavelength side are observed as a hue. Therefore, a xanthene colorant having an ideal magenta color is required to be such that both absorption bands overlap with each other on the absorption band of the complementary color of a magenta color. Examples of such xanthene colorants include C.I. Acid Red 289. Since such a colorant is water-soluble, however, it involves a problem that the water fastness of an image formed with an ink containing the colorant is poor.

It has heretofore been reported to develop colorants having an analogous structure to C.I. Acid Red 289. For example, there is disclosed a process for obtaining a water-soluble polymeric dye by chlorosulfonating C.I. Acid Red 289 and then sulfonamidating the resultant product with a water-soluble polymeric quaternary ammonium salt, and ink solutions using such an ink (see Japanese Patent Registration No. 3263524). A process for producing an ink-jet recording liquid with a C.I. Acid Red 289 analogue is also disclosed (see, for example, Japanese Patent Application Laid-Open No. H09-255882). Since these colorants are water-soluble, however, the water fastness of images formed by such inks is not sufficient, and these colorants are inferior to C.I. Acid Red 289 in point of a hue as a magenta color.

As described above, no colorant having a good magenta color and high oil-solubility, i.e., high solubility in organic solvents, particularly, nonpolar solvents has been known to date.

SUMMARY OF THE INVENTION

It is an object of the present invention to provide a colorant compound, particularly, a magenta colorant compound that is excellent in spectral reflection properties such as coloring ability and transparency and high in solubility in organic solvents, particularly, nonpolar solvents.

Another object of the present invention is to provide a colorant compound, particularly, a magenta colorant compound that has a good hue when it is put into an aqueous colorant dispersion such as an ink-jet ink and that can provide an ink image excellent in water fastness.

A further object of the present invention is to provide an ink comprising such a compound, and an ink tank, a recording unit, a recording apparatus and a recording process comprising or using the ink.

The above objects can be achieved by the present invention described below.

According to the present invention, there is thus provided a colorant compound represented by the following general formula (1):

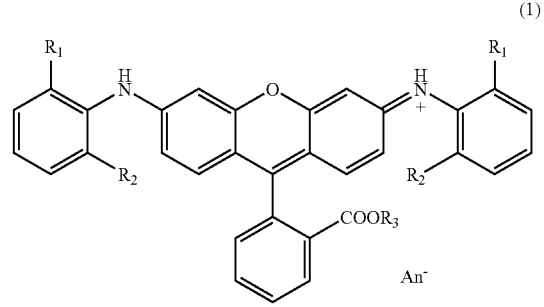

(1)

wherein $R_1$ and $R_2$ are the same or different from each other and denote a linear alkyl group having 1 to 4 carbon atoms, $R_3$ is an alkyl group having 1 to 6 carbon atoms, and $An^-$ is a counter anion.

According to the present invention, there is also provided an ink comprising an aqueous medium and a colorant compound, wherein the colorant compound is represented by the general formula (1).

According to the present invention, there is further provided an ink tank comprising an ink container part containing the ink described above.

According to the present invention, there is still further provided a recording unit comprising an ink container part containing the ink described above and a head part for ejecting droplets of the ink.

According to the present invention, there is yet still further provided an ink-jet recording apparatus comprising the ink described above and an ink-jet recording head for ejecting the ink.

According to the present invention, there is yet still further provided an ink-jet recording process comprising the step of ejecting the ink described above on a recording medium by an ink-jet system.

DETAILED DESCRIPTION OF THE PREFERRED EMBODIMENTS

Figure 1:
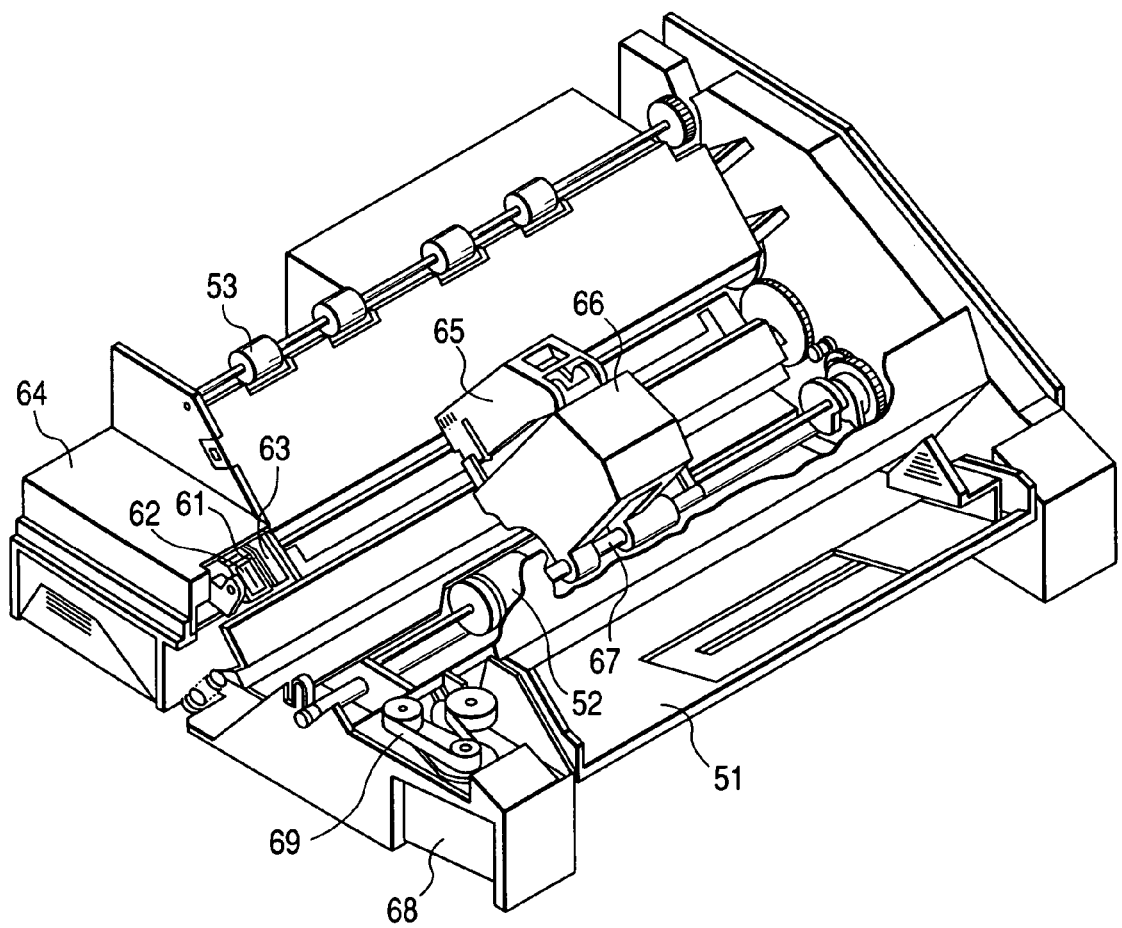
FIG. 1 is a perspective view illustrating an exemplary ink-jet recording apparatus.

The present inventors have carried out an extensive investigation with a view toward solving the above-described problems involved in the prior art. As a result, it has been found that colorant compounds represented by the following general formula (1) are excellent in spectral reflection properties such as coloring ability and transparency, high in solubility in organic solvents, particularly, nonpolar solvents, and useful as colorants for magenta inks, thus leading to completion of the present invention. In particular, the colorant compounds represented by the following general formula (1) make it possible to control their solubility in organic solvents, particularly, nonpolar solvents by changing an anion species (An⁻) which will become a counter anion. When such a colorant compound is used to prepare an aqueous colorant dispersion, an ink having a good hue as a magenta color and suitably used in ink-jet recording can be provided.

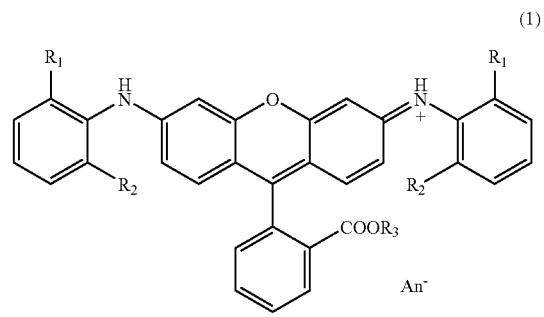

(1)

wherein $R_1$ and $R_2$ are the same or different from each other and denote, independently of each other, a linear alkyl group having 1 to 4 carbon atoms, $R_3$ is an alkyl group having 1 to 6 carbon atoms, and An⁻ is a counter anion.

The colorant compounds represented by the general formula (1) have a xanthene skeleton and show a hue of a magenta color. In addition, they have a great molar extinction coefficient like general xanthene compounds and exhibit high coloring power. Further, the compounds according to the present invention are cationic colorants, and their solubility in nonpolar solvents and aqueous media can be controlled by changing an anionic component (An⁻) that is a counter anion.

In the general formula (1), the linear alkyl groups having 1 to 4 carbon atoms in $R_1$ and $R_2$ include methyl, ethyl, n-propyl and n-butyl groups. $R_1$ and $R_2$ may be the same or different from each other. However, it is preferred from the viewpoints of hue and material cost that both $R_1$ and $R_2$ be methyl groups or ethyl groups. Both $R_1$ and $R_2$ are particularly preferably methyl groups.

In the general formula (1), examples of the alkyl group having 1 to 6 carbon atoms in $R_3$ include methyl, ethyl, n-propyl, isopropyl, n-butyl, sec-butyl, tert-butyl, n-pentyl and n-hexyl groups. From the viewpoints of material cost and easy synthesis, $R_3$ is preferably a methyl or ethyl group, with an ethyl group being particularly preferred.

As described above, in the compounds represented by the general formula (1), their solubility in organic solvents, particularly, nonpolar solvents can be controlled by changing an anion species which will become a counter anion An⁻ in the formula. Preferable examples of An⁻ include halide ions such as a chloride ion (Cl⁻), a bromide ion (Br⁻) and an iodide ion (I⁻), inorganic ions such as a sulfate ion ($SO_4^{2-}$), a perchlorate ion ($ClO_4^-$), a tetrafluoroborate ion ($BF_4^-$) and a hexafluorophosphate ion ($PF_6^-$), fatty acid ions (R—COO⁻: R denotes an aliphatic group) such as an acetate ion ($CH_3COO^-$) and a propionate ion ($C_2H_5COO^-$), aromatic carboxylate ions (Ar—COO⁻: Ar denotes an aromatic group) such as a benzoate ion ($C_6H_5COO^-$) and a 1- (or 2-) naphthalenecarboxylate ion ($C_{10}H_7COO^-$), and besides a p-toluenesulfonate ion ($CH_3C_6H_4SO_3^-$) and a methacrylate ion ($CH_2C(CH_3)COO^-$). Among the above-mentioned ions, fatty acid ions, p-toluenesulfonate ion, methacrylate ion and aromatic carboxylate ions are preferred, with aromatic carboxylate ions being particularly preferred.

The colorant compounds according to the present invention represented by the general formula (1) can be synthesized in accordance with any publicly known process. An exemplary synthetic scheme is described below. Incidentally, in the following general formulae (2) to (4), $R_1$ to $R_3$ have the same definitions as those in the general formula (1).

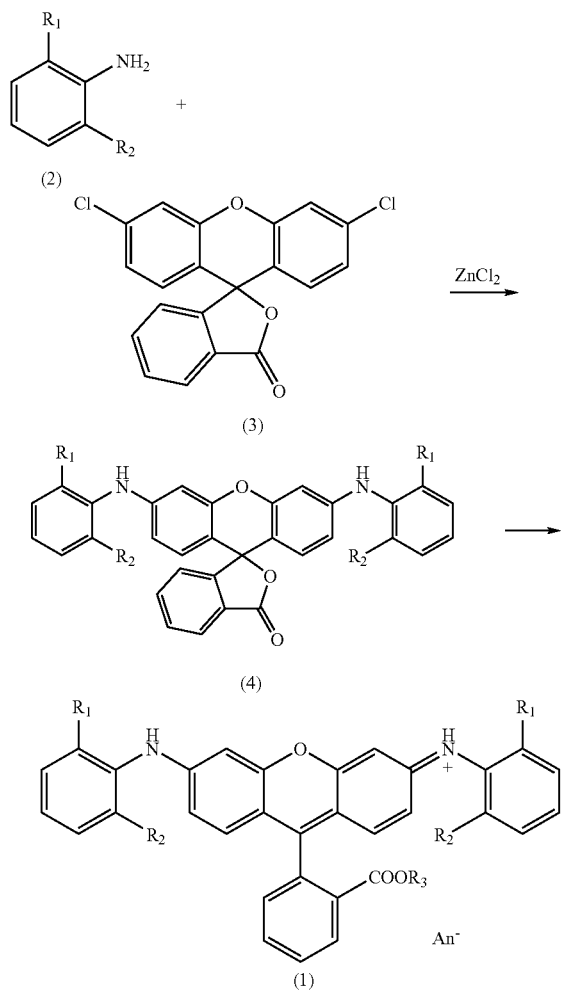

As described above, 2,6-dialkylaniline (2) is first condensed with 3,6-dichlorofluoran (3) under heat in the presence of zinc chloride in an organic solvent (or in the presence of no solvent) (first step: condensation). A leuco compound formed in the first step and represented by a general formula (4) is then esterified to obtain a colorant compound (1) according to the present invention (second step: esterification). Lastly, the colorant compound (1) thus obtained is dissolved in an organic solvent to conduct salt exchange with the sodium salt of the intended anion, thereby obtaining a colorant compound having a desired anion (An$^-$) as a counter ion (third step: salt exchange) Examples of the organic solvent used in the first step of the above synthetic scheme include high-boiling solvents. For example, ethylene glycol, N-methylpyrrolidone, dichlorobenzene, sulfolane or the like is preferably used. The reaction is conducted in a temperature range of from 150 to 220° C., preferably from 170 to 220° C.

The esterification in the second step of the above synthetic scheme may be conducted by a method such as a reaction of the leuco compound with its corresponding alcohol ($R_3OH$) or with alkyl halide ($R_3X$) or dialkyl sulfate [($R_3$)$_2SO_4$] in the presence of an acid catalyst. Either reaction may be applied to the present invention. As the acid catalyst used in this case, any of the acids used in an ordinary esterification reaction, such as sulfuric acid, hydrochloric acid (hydrogen chloride) and p-toluenesulfonic acid may be used. Hydrogen chloride is particularly preferably used. The reaction is generally conducted at a temperature of from 20 to 120° C. The colorant compound (1) obtained in this step forms a counter ion to the anion of the acid used as the catalyst.

No particular limitation is imposed on the organic solvent used in the salt exchange reaction of the third step. However, a protic solvent such as an alcohol is preferably used. The reaction of the third step is generally conducted at 20 to 100° C.

The final product obtained through the first to third steps described above is used in end applications intended after it is treated in accordance with an ordinary post-treatment method for organic synthetic reactions and purified. Incidentally, reaction products obtained in Synthesis Examples, which will be described subsequently, were identified by $^1$H and $^{13}$C nuclear magnetic resonance (NMR) spectrometric analyses (ECA-400, manufactured by JEOL Ltd.) and HPLC (high-performance liquid chromatography) analysis.

The colorant compounds according to the present invention have a hue of a bright magenta color and may be used as coloring materials, preferably, materials for recording of image information by virtue of their spectral properties. Specifically, they may be used as materials of inks for recording of an ink-jet system, which will be described in detail subsequently, and besides printing inks, paints and inks for writing utensils. In particular, they are useful as coloring materials of inks for recording of an ink-jet system.

Ink-jet inks comprising the colorant compound according to the present invention will now be described. The colorant compound represented by the general formula (1) is dissolved or/and dispersed in a lipophilic medium or aqueous medium, whereby an aqueous colorant dispersion usable as an ink can be prepared. The aqueous medium is particularly preferably used. When the ink-jet ink is prepared, the colorant compound is preferably contained in the ink in a proportion of 0.2 to 10 parts by mass per 100 parts by mass of the ink. In this case, other dyes and/or pigments may be used in combination with the colorant compound according to the present invention. When a plurality of colorants are used in combination, it is preferable that the total content of the colorants amounts to the above range.

In the case of the above-described ink, water or a mixed medium of water and a water-soluble organic solvent may be used as the aqueous medium. No particular limitation is imposed on the water-soluble organic solvent so far as it exhibits water-solubility, and examples thereof include alcohols, polyhydric alcohols, polyglycols, glycol ethers, nitrogen-containing polar solvents and sulfur-containing polar solvents. These water-soluble organic solvents are preferably contained in a range of from 1 to 40% by mass, more preferably from 3 to 30% by mass based on the total mass of the ink in view of the maintenance of moisture retention of the ink, improvement in solubility of the coloring material, effective penetration of the ink into recording paper, etc. The content of water in the ink is preferably within a range of from 30 to 95% by mass based on the total mass of the ink for the purpose of improving the dispersibility or solubility of the coloring materials including the colorant compound according to the present invention in the ink, imparting a sufficient viscosity to stably eject the ink when the ink is used for ink-jet recording and preventing the occurrence of clogging at an orifice.

In the present invention, a dispersing agent for dispersing the colorant compound in the aqueous medium is preferably used. Specifically, a chemically synthesized surfactant such as an ionic surfactant, nonionic surfactant or polymeric surfactant may be used. Besides, those derived from a natural product or its modified product with an enzyme or the like may also be used. These dispersing agents may be used either singly or in any combination thereof. The total content of the dispersing agents. is 0.5 to 20% by mass based on the total mass of the ink for the purpose of satisfactorily retaining the dispersion stability of the colorant compound according to the present invention.

No particular limitation is imposed on the kind of the dispersing agent. Examples of the ionic surfactant include anionic surfactants such as aliphatic monocarboxylic acid salts, polyoxyethylene alkyl ether carboxylates, N-acylsarcosine salts, N-acylglutamic acid salts, dialkylsulfosuccinic acid salts, alkanesulfonic acid salts, alpha-olefinsulfonic acid salts, linear or branched alkylbenzenesulfonic acid salts, naphthalenesulfonic acid salt-formaldehyde condensates, alkylnaphthalenesulfonic acid salts, N-methyl-N-acyltaurine salts, alkylsulfuric acid salts, polyoxyethylene alkyl ether sulfates, oil or fat sulfate salts, alkylphosphoric acid salts, polyoxyethylene alkyl ether phosphates and polyoxyethylene alkyl phenyl ether phosphates; cationic surfactants such as alkylamine salts, dialkyldimethyl ammonium chlorides, bromides and iodides, alkylbenzalkonium chlorides and alkylpyridinium chlorides; and ampholytic surfactants such as alkylbetaines, fatty acid amide propylbetaines, 2-alkyl-N-carboxymethyl-N-hydroxyethylimidazolinium betaines, alkyl or dialkyldiethylenetriaminoacetic acids and alkylamine oxides.

Examples of the nonionic surfactant include glycerol fatty acid esters, sorbitan fatty acid esters, sucrose fatty acid esters, polyoxyethylene alkyl ethers, polyoxyethylene alkyl phenyl ethers, polyoxyethylene polyoxypropylene glycol, fatty acid polyethylene glycols, fatty acid polyoxyethylene sorbitans and fatty acid alkanolamides.

Examples of the polymeric surfactant include anionic polymers such as polyacrylic acid salts, styrene-acrylic acid copolymer salts, vinylnaphthalene-acrylic acid copolymer salts, styrene-maleic acid copolymer salts, vinylnaphthalene-maleic acid copolymer salts and polyphosphoric acid; and nonionic polymers such as polyvinyl alcohol, polyvinyl pyrrolidone and polyalkylene glycols.

Examples of the dispersing agent derived from a natural product or its modified product with an enzyme or the like include proteins such as gelatin and casein, natural rubber such as gum arabic, glucosides such as saponin, cellulose derivatives such as alkyl celluloses, carboxyalkyl celluloses and hydroxyalkyl celluloses, natural polymers such as lignin sulfonic acid salts and shellac, and surfactants for food, such as lecithin and enzymolyzed lecithin.

No particular limitation is imposed on the pH of the ink produced by using the colorant compound according to the present invention. However, the pH is preferably within a range of from 4.0 to 11.0 taking safety and the like into consideration. When an ink-jet ink is prepared, moisture-retaining solids such as urea, urea derivatives and trimethylolpropane may be used as a component for the ink for the purpose of maintaining the moisture retention of the ink. The content of the moisture-retaining solids, such as urea, urea derivatives and trimethylolpropane, in the ink is generally within a range of preferably from 0.1 to 20.0% by mass, more preferably from 3.0 to 10.0% by mass based on the total mass of the ink.

Besides the above components, various additives such as pH adjustors, rust preventives, preservatives, mildewproofing agents, antioxidants, reduction-preventing agents, evaporation accelerators, chelating agents and water-soluble polymers may be contained, as needed, when an ink is prepared. The inks prepared by using the colorant compounds according to the present invention in the above-described manner are particularly preferably used in an ink-jet recording system of a type in which ink droplets are ejected by the action of thermal energy. It goes without saying that the colorant compounds according to the present invention may also be used in inks applied to other ink-jet recording systems and as materials for general writing utensils. In addition, the colorant compounds according to the present invention may be sufficiently applied to not only uses as coloring agents, but also applications to electronic materials such as colorants for optical recording and colorants for color filters.

The recording apparatus according to the present invention will hereinafter be described. A preferred recording apparatus for conducting recording by using the inks according to the present invention is an apparatus in which thermal or mechanical energy corresponding to recording signals is applied to an ink within a chamber of a recording head having an ink container part containing these inks, and ink droplets are generated by the energy.

FIG. 1 illustrates an example of an ink-jet recording apparatus in which such a head has been incorporated. In FIG. 1, reference numeral 61 designates a blade serving as a wiping member, one end of which is a stationary end held by a blade-holding member to form a cantilever. The blade 61 is provided at a position adjacent to a region in which the recording head operates, and in the embodiment illustrated in FIG. 1, is held in such a form that it protrudes into the course through which the recording head is moved. Reference numeral 62 indicates a cap which is provided at a home position adjacent to the blade 61, and is so constructed that it moves in a direction perpendicular to a direction in which the recording head is moved, and comes into contact with the face of ejection openings to cap it. Reference numeral 63 in FIG. 1 denotes an ink absorbing member provided adjoiningly to the blade 61 and, similar to the blade 61, held in such a form that it protrudes into the course through which the recording head is moved.

The above-described blade 61, cap 62 and absorbing member 63 constitute an ejection-recovery portion 64, where the blade 61 and absorbing member 63 remove water, dust, dirt and/or the like from the face of the ink-ejecting openings. Reference numeral 65 designates the recording head having an ejection-energy-generating means and serving to eject an ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a feeding part from which the recording medium is inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the ejection-recovery portion 64 is receded from the path of motion of the recording head 65 when the recording head 65 is returned to its home position after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 2:
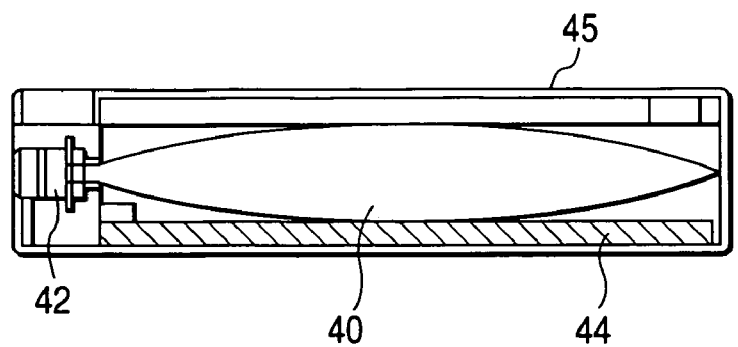
FIG. 2 is a longitudinal cross-sectional view illustrating an ink cartridge.

FIG. 2 is a cross-sectional view illustrating an exemplary ink cartridge 45 in which an ink to be fed to a head through a member for feeding the ink, for example, a tube is contained. Here, reference numeral 40 designates an ink container part containing the ink to be fed, as exemplified by a bag for ink. One end thereof is provided with a stopper 42 made of rubber. A needle (not illustrated) may be inserted into this stopper 42 so that the ink in the bag 40 for ink can be fed to the head. Reference numeral 44 indicates an ink absorbing member for receiving a waste ink.

Figure 3:
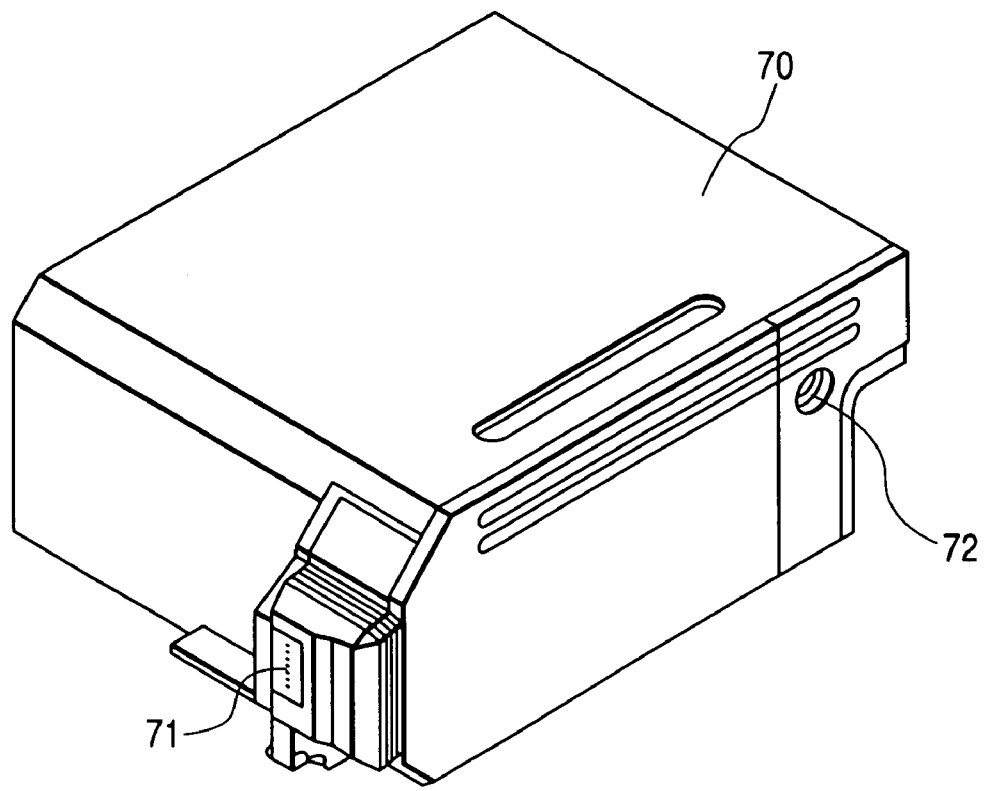
FIG. 3 is a perspective view illustrating a recording unit.

The ink-jet recording apparatus used in the present invention is not limited to the apparatus as described above in which the head and the ink cartridge are separately provided. Therefore, a device in which these members are integrally formed as shown in FIG. 3 can also be preferably used. In FIG. 3, reference numeral 70 designates a recording unit, in the interior of which an ink container part containing an ink, for example, an ink absorbing member, is contained. The recording unit 70 is so constructed that the ink in such an ink absorbing member is ejected in the form of ink droplets through a head 71 having a plurality of orifices. Reference numeral 72 indicates an air passage for communicating the interior of the recording unit 70 with the atmosphere. This recording unit 70 is used in place of the recording head 65 shown in FIG. 1, and is detachably installed on the carriage 66.

Figure 4:
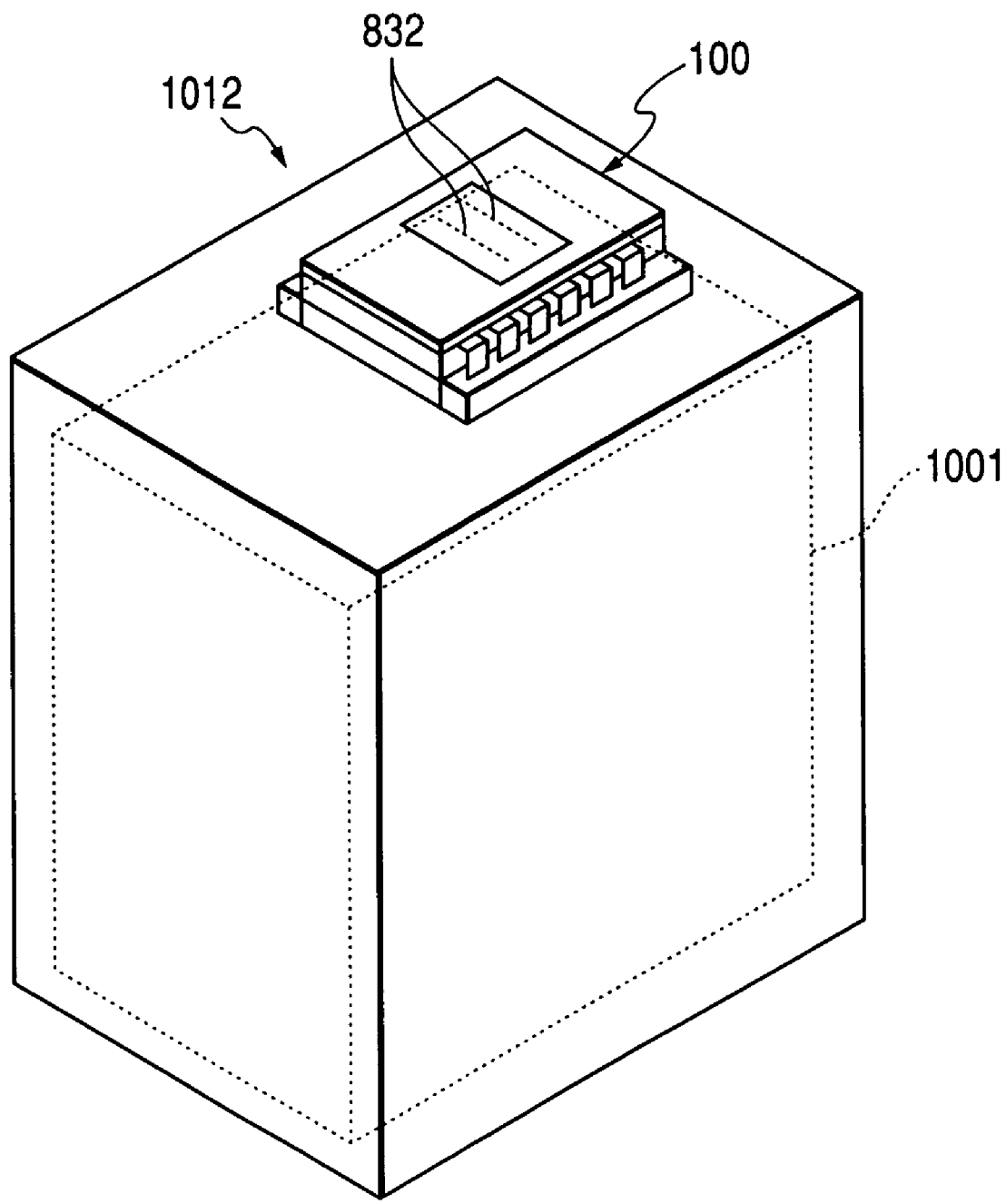
FIG. 4 is a schematic perspective view illustrating an exemplary ink-jet cartridge equipped with a liquid-ejecting head.

FIG. 4 illustrates an exemplary ink-jet cartridge capable of being mounted on the above-described ink-jet recording apparatus. The cartridge 1012 in this embodiment is of a serial type, and its principal part is constructed by an ink-jet recording head 100 and a liquid tank 1001 for containing a liquid such as an ink. In the ink-jet recording head 100, a great number of ejection openings 832 for ejecting the liquid are formed, and the liquid such as an ink is directed to a common liquid chamber in the liquid-ejecting head 100 through a liquid feed passage (not illustrated) from the liquid tank 1001. The cartridge 1012 illustrated in FIG. 4 is so constructed that the ink-jet recording head 100 and the liquid tank 1001 are integrally formed, and the liquid can be supplied to the interior of the liquid tank 1001 as needed. However, such a structure that the liquid tank 1001 is replaceably joined to this liquid-ejecting head 100 may also be adopted.

The present invention will hereinafter be described in more detail by the following Examples and Comparative Examples. However, the present invention is not limited to these examples at all. Incidentally, all designations of "part" or "parts" and "%" as will be used in the following examples mean part or parts by mass and % by mass unless expressly noted otherwise.

EXAMPLE 1

A colorant compound represented by the general formula (1) was obtained in the following manner.

Synthesis Example 1

A colorant compound represented by the following formula (5), in which in the general formula (1), $R_1$ and $R_2$ were methyl groups, $R_3$ was an ethyl group, and $An^-$ was a chloride ion, was synthesized in the following manner.

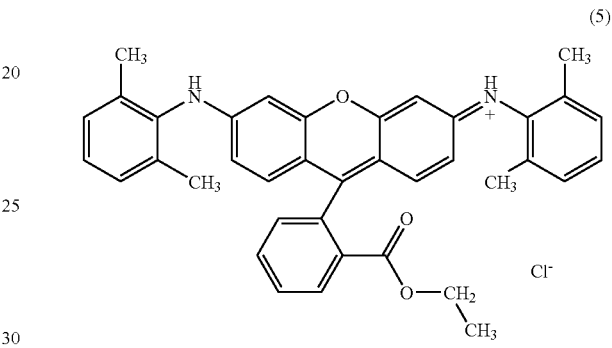

(5)

2,6-xylidine (7.3 g) and 3,6-dichlorofluoran (7.4 g) represented by the formula (3) were heated at 200° C. for 3 hours in the presence of zinc chloride (4.1 g) in sulfolane (20 mL). After the resultant solution was cooled, the solution was poured into 2 M hydrochloric acid (50 mL), and deposited crystals were separated by filtration. After the crystals were washed with water and dissolved in THF, the crystals were reprecipitated in n-hexane to purify them and dried, thereby obtaining a leuco compound represented by the general formula (4) and having a structure that both $R_1$ and $R_2$ are methyl groups. The fact that the reaction product thus obtained is the leuco compound having the above structure was identified by NMR analyses and HPLC analysis. The analyzed results are shown below.

[Analyzed results as to the leuco compound (4) ($R_1$, $R_2$: methyl groups)]

[1] Result of $^1$H NMR (400 MHz, DMSO-$d_6$, room temperature):

δ=2.87(s,12H), 6.69(s,2H), 7.05–7.07(m,2H), 7.17(d, 2H), 7.80–7.87(m,6H), 8.05(d,1H), 8.43(t,1H), 8.50–8.57 (m,3H), 8.70(d,1H).

[2] Result of $^{13}$C NMR (100 MHz, DMSO-$d_6$, room temperature):

δ=18.1, 84.9, 97.5, 107.0, 110.2, 124.4, 124.6, 126.3, 127.1, 128.6, 128.8, 130.1, 135.5, 136.2, 137.6, 149.6, 152.3, 152,6, 169.0.

[3] Result of HPLC [purity=98.2% by area, retention time=11.7 minutes (phosphate buffer-MeOH-THF)]: λmax=519 nm, ε=71,950 $M^{-1}cm^{-1}$ (solvent: MeOH, at room temperature).

The leuco compound (4) (5.0 g) obtained by the above-described process was dissolved in absolute ethanol (25 mL), and the solution was stirred at 80° C. for 6 hours while blowing HCl gas into the solution. Thereafter, the reaction mixture was poured into water (100 mL), and deposited crystals were washed with water and dried, thereby obtaining a compound (hereinafter referred to as "Colorant Compound (5)") having a structure represented by the formula (5). The fact that the compound thus obtained has the structure represented by the formula (5) was identified by NMR analyses and HPLC analysis. The analyzed results are shown below.

[Analyzed results as to Colorant Compound (5)]

[1] Result of $^1$H NMR (400 MHz, CDCl$_3$, room temperature):

δ=1.00(t,3H), 2.11(s,12H), 4.06(q,2H), 6.17(s,2H), 6.75 (d,2H), 6.98–7.11(m,10H), 7.22–7.23(m,1H), 7.66–7.74(m, 2H), 8.26(d,1H).

[2] Result of $^{13}$C NMR (100 MHz, CDCl$_3$, room temperature):

δ=18.2, 30.3, 61.4, 114.4, 125.5, 127.0, 128.2, 128.4, 129.8, 130.2, 130.5, 131.1, 132.4, 134.1, 135.2, 135.7, 136.9, 151.5, 157.1, 157.3, 165.2.

[3] Result of HPLC [purity=96.8% by area, retention time=8.4 minutes (phosphate buffer-MeOH-THF)]:

λmax=529 nm, ε=90,150 M$^{-1}$cm$^{-1}$ (solvent: MeOH, at room temperature).

Figure 5:
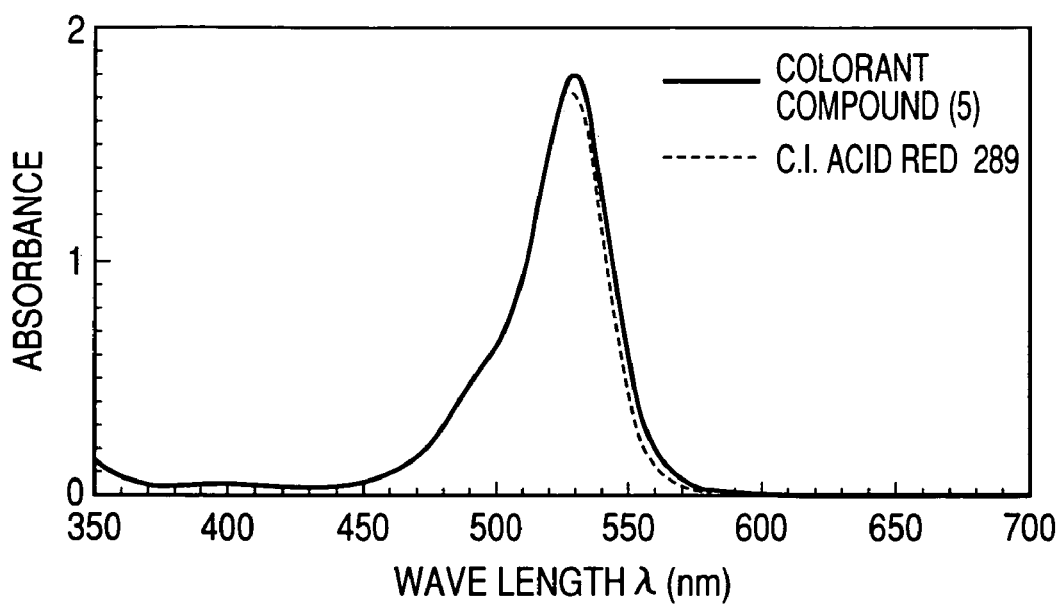
FIG. 5 diagrammatically illustrates ultraviolet-visible absorption spectra (concentration: $2.0 \times 10^{-6}$ $M^{-1}$) of Colorant Compound (5) (solid line) according to the present invention and C.I. Acid Red 289 (broken line) at room temperature in methanol.

Ultraviolet-visible absorption spectra of Colorant Compound (5) obtained in Synthesis Example 1 and C.I. Acid Red 289 are illustrated in FIG. 5. As illustrated in FIG. 5, Colorant Compound (5) obtained in Synthesis Example 1 had a sharp absorption band at 450 to 580 nm like C.I. Acid Red 289 and did not have any other secondary absorption in a visible region, so that this compound was known to be a good magenta colorant.

Synthesis Example 2

A colorant compound represented by the following formula (6), in which in the general formula (1), R$_1$ and R$_2$ were methyl groups, R$_3$ was an ethyl group, and An$^-$ was a 2-naphthalenecarboxylate ion, was synthesized in the following manner.

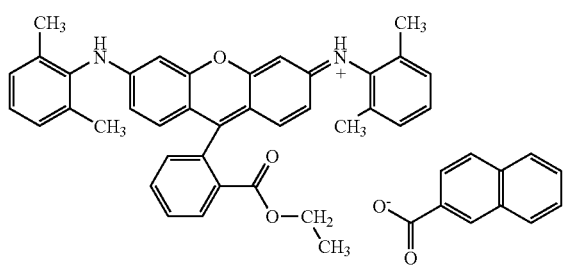

(6)

Colorant Compound (5) (10 g) obtained in Synthesis Example 1 and sodium 2-naphthalenecarboxylate (4.6 g) were dissolved in methanol (100 mL), and a reaction was conducted for 24 hours under reflux. After a deposited salt was separated by filtration and the solvent in the filtrate was distilled off, the residue was extracted with chloroform (500 mL) and the resultant extract solution was washed with water. Finally, this solution was dried over magnesium sulfate (50 g) and concentrated, and the resultant concentrate was then reprecipitated in n-hexane to purify it, thereby obtaining a compound (hereinafter referred to as "Colorant Compound (6)") having a structure represented by the formula (6). The fact that the compound thus obtained has the structure represented by the formula (6) was identified by NMR analyses and HPLC analysis. The analyzed results are shown below.

[Analyzed results as to Colorant Compound (6)]

[1] Result of $^1$H NMR (400 MHz, CDCl$_3$, room temperature)

δ=0.94(t,3H), 2.07(s,12H), 4.00(q,2H), 6.12(s,1H), 6.74 (d,2H), 6.96–7.09(m,11H), 7.30(t,1H), 7.37(t,1H), 7.55–7.63(m,4H), 7.70(d,1H), 8.02(dd,1H), 8.21(d,1H), 8.34(s,1H).

[2] Result of $^{13}$C NMR (100 MHz, CDCl$_3$, room temperature):

δ=18.1, 30.3, 34.2, 113.9, 125.1, 125.5, 126.0, 126.6, 127.0, 127.2, 127.4, 128.2, 128.5, 128.8, 129.0, 129.8, 130.1, 130.2, 130.3, 131.1, 132.4, 132.8, 133.9, 134.0, 135.7, 135.8, 136.0, 136.4, 151.5, 157.7, 164.9, 172.8.

[3] Result of HPLC [purity=96.8% by area, retention time=8.4 minutes (phosphate buffer-MeOH-THF)]:

λmax=529 nm, ε=84,100 M$^{-1}$cm$^{-1}$ (solvent: MeOH, at room temperature).

Figure 6:
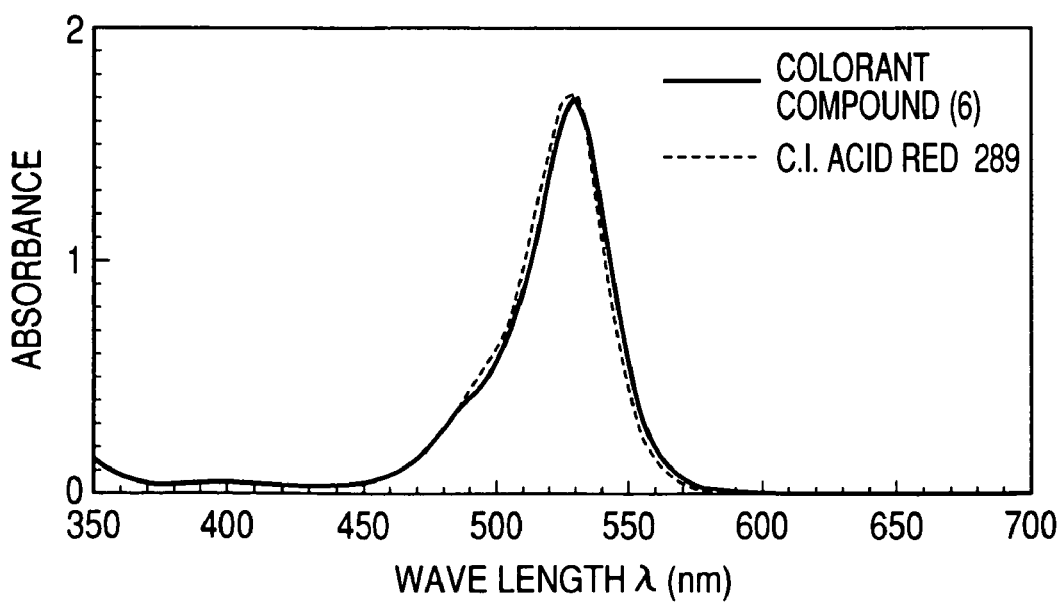
FIG. 6 diagrammatically illustrates ultraviolet-visible absorption spectra (concentration: $2.0 \times 10^{-6}$ $M^{-1}$) of Colorant Compound (6) (solid line) according to the present invention and C.I. Acid Red 289 (broken line) at room temperature in methanol.

Ultraviolet-visible absorption spectra of Colorant Compound (6) obtained in Synthesis Example 2 and C.I. Acid Red 289 are illustrated in FIG. 6. As illustrated in FIG. 6, Colorant Compound (6) obtained by changing the counter anion was also known to be a good magenta colorant like Colorant Compound (5) obtained in Synthesis Example 1.

Other Synthesis Examples

Syntheses were conducted in accordance with the process of Synthesis Example 1 or Synthesis Example 2 described above in such a manner that R$_1$, R$_2$, R$_3$ and An$^-$ in the general formula (1) are as shown in Table 1, thereby obtaining novel Colorant Compounds (7) to (16). The structures of these compounds were identified by NMR analyses and HPLC analysis in the same manner as in Colorant Compounds (5) and (6).

TABLE 1

Structures of Colorant Compounds (5) to (16)

| Compound No. | R1 | R2 | R3 | An$^-$ |
|---|---|---|---|---|
| (5) | —CH$_3$ | —CH$_3$ | —C$_2$H$_5$ | Cl$^-$ |
| (6) | —CH$_3$ | —CH$_3$ | —C$_2$H$_5$ | 2-naphthalenecarboxylate |
| (7) | —CH$_3$ | —CH$_3$ | —C$_2$H$_5$ | benzoate |
| (8) | —CH$_3$ | —CH$_3$ | —C$_2$H$_5$ | 4-methylbenzenesulfonate |

TABLE 1-continued

Structures of Colorant Compounds (5) to (16)

| Compound No. | R1 | R2 | R3 | An⁻ |
|---|---|---|---|---|
| (9) | —CH$_3$ | —CH$_3$ | —C$_2$H$_5$ | methacrylate anion |
| (10) | —CH$_3$ | —CH$_3$ | —C$_2$H$_5$ | ⁻BF$_4$ |
| (11) | —CH$_3$ | —CH$_3$ | —C$_2$H$_5$ | ⁻PF$_6$ |
| (12) | —CH$_3$ | —CH$_3$ | —C$_2$H$_5$ | ⁻ClO$_4$ |
| (13) | —CH$_3$ | —CH$_3$ | n-C$_6$H$_{13}$— | Cl⁻ |
| (14) | —CH$_3$ | —CH$_3$ | n-C$_6$H$_{13}$— | ⁻ClO$_4$ |
| (15) | —CH$_3$ | —C$_2$H$_5$ | —C$_2$H$_5$ | Cl⁻ |
| (16) | —C$_2$H$_5$ | —C$_2$H$_5$ | —C$_2$H$_5$ | Cl⁻ |

Determination of Solubility

With respect to Colorant Compounds (5) to (16) obtained above, solubility in chloroform at room temperature was determined. The results thereof are shown in Table 2.

TABLE 2

Solubility in chloroform

| Compound No. | Solubility (% by mass) |
|---|---|
| (5) | 10.7 |
| (6) | 20.5 |
| (7) | 18.2 |
| (8) | 12.3 |
| (9) | 11.2 |
| (10) | 8.3 |
| (11) | 9.1 |
| (12) | 9.8 |
| (13) | 13.2 |
| (14) | 15.8 |
| (15) | 11.8 |
| (16) | 12.4 |

As apparent from Table 2, all Colorant Compounds (5) to (16) exhibit high solubility in chloroform that 5 is a nonpolar solvent. Particularly, Compounds (6) and (7) having an aromatic carboxylate ion as a counter anion exhibited higher solubility. From the results of a comparison among Colorant Compounds (5), (13), (15) and (16) having a chloride ion as a counter anion and comparison between Colorant Compounds (12) and (14) having a perchlorate ion as a counter anion, it was revealed that the colorant compounds of the structure in which the chain lengths of the alkyl groups of R$_1$, R$_2$ and R$_3$ in the general formula (1) are longer tend to exhibit higher solubility in chloroform and are advantageous. Incidentally, C.I. Acid Red 289 is not dissolved in chloroform.

EXAMPLE 2

Preparation of Colorant Dispersion and Ink Solution

A mixture composed of the colorant compound (20 parts) represented by the formula (5), DEMOL N (trade name, product of Kao Corporation, 12 parts) as a dispersing agent and ion-exchanged water (128 parts) was stirred for 18 hours by means of a paint shaker (manufactured by Toyo Seiki Seisaku-sho, Ltd.) using zirconia beads (product of Nikkato Corporation, 330 parts) having a diameter of 0.5 mm. Then a colorant dispersion having a solid concentration of 12.5% was obtained by removing the zirconia beads.

After Acetylenol (trade name, product of Kawaken Fine Chemicals Co., Ltd., 5 parts), ethylene glycol (50 parts) and glycerol (50 parts) were then added to the colorant dispersion, ion-exchanged water was added to adjust the concentration of the colorant to 2%, thereby preparing Ink Solution (A).

Ink Solution (B) was prepared in the same manner as described above except that the colorant compound used in Ink Solution (A) was changed to the colorant compound represented by the formula (6).

Ink Solution (C) was prepared in the same manner as described above except that the colorant compound used in Ink Solution (A) was changed to C.I. Pigment Red 122.

On the other hand, C.I. Acid Red 289 (2 parts), Acetylenol (0.05 parts) and ethylene glycol (5 parts) were added to ion-exchanged water, and the resultant mixture was sufficiently stirred into a solution, thereby obtaining Ink Solution (D) with the colorant concentration adjusted to 2%.

<Evaluation>

Each of Ink Solutions (A) to (D) was charged into an ink cartridge of a Bubble-Jet™ printer Pixus 950i (trade name, manufactured by Canon Inc.) to print a 2 cm-square solid image on photographic glossy paper, "Professional Photopaper (PR-101)" (trade name, product of Canon Inc.) and plain paper, "PPC Paper (NSK)" (trade name, product of Canon Inc.), thereby producing a recorded article. The resultant recorded article was then air-dried for 24 hours.

[Chroma]

With respect to the respective recorded articles on photographic glossy paper obtained by the above-described process, optical densities and chromaticities (a* and b*) in the L*a*b* color space were measured by means of a reflection densitometer, Spectrolino (trade name, manufactured by Gretag Macbeth Co.). The chroma was calculated out in accordance with the following equation on the basis of the measured values of the color characteristics. The recorded article was judged to be a high-quality print where the chroma was 50 or higher.

$$\text{Chroma } (c^*) = \sqrt{(a^*)^2 + (b^*)^2}$$

[Water Fastness]

Each of the recorded articles obtained by printing on the plain paper was fixed to an inclined plate with an inclination of 45°, water (1 mL) was dropped on the recorded article by a syringe, and the recorded article was left to stand for 2 hours as it is. After left to stand, bleeding of the image of the recorded article was visually investigated to evaluate each ink solution as to water fastness in accordance with the following standard.

A: trace of water is not colored;

B: trace of water is colored.

The result thereof was shown together with the kind of the colorant used in each ink solution and the characteristics of the ink in Table 3.

TABLE 3

| Ink solution | Colorant compound used | Chroma (c*) | Water fastness |
|---|---|---|---|
| (A) | Formula (5) | 59.0 | A |
| (B) | Formula (6) | 60.0 | A |
| (C) | C.I. Pigment Red 122 | 39.8 | A |
| (D) | C.I. Acid Red 289 | 69.9 | B |

As is apparent from Table 3, the ink solutions using the colorant compound according to the present invention are good in chroma and water fastness, and the colorant compounds according to the present invention are thus useful as coloring agents for ink-jet magenta ink.

According to the present invention, there can be provided colorant compounds, particularly, magenta colorant compounds that are excellent in spectral reflection properties such as coloring ability and transparency and high in solubility in organic solvents, particularly, nonpolar solvents. Since the colorant compounds make it possible to control their solubility in organic solvents, particularly, nonpolar solvents, aqueous colorant dispersions having a good hue of a magenta color are provided by using such colorant compounds. The aqueous colorant dispersions can be usefully used as, for example, inks for ink-jet recording.

This application claims priority from Japanese Patent Application Nos. 2004-037286 filed on Feb. 13, 2004 and 2005-015018 filed on Jan. 24, 2005, which are hereby incorporated by reference herein.

What is claimed is:

1. A colorant compound represented by the following general formula (1):

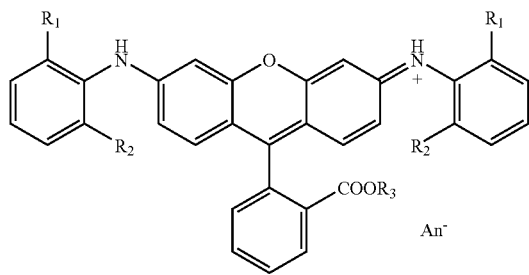

wherein $R_1$ and $R_2$ are the same or different from each other and denote a linear alkyl group having 1 to 4 carbon atoms, $R_3$ is an alkyl group having 1 to 6 carbon atoms, and An⁻ is a counter anion.

2. The colorant compound according to claim 1, wherein $R_1$ and $R_2$ are methyl groups or ethyl groups.

3. The colorant compound according to claim 1, wherein $R_3$ is a methyl group or ethyl group.

4. The colorant compound according to claim 1, wherein An⁻ is at least one ion selected from the group consisting of halide ions, a sulfate ion ($SO_4^{2-}$), a perchlorate ion ($ClO_4^-$), a tetrafluoroborate ion ($BF_4^-$), a hexafluorophosphate ion ($PF_6^-$), a methacrylate ion ($CH_2C(CH_3)COO^-$), a p-toluenesulfonate ion ($CH_3C_6H_4SO_3^-$), fatty acid ions (R—COO⁻: R denotes an aliphatic group) and aromatic carboxylate ions (Ar—COO⁻: Ar denotes an aromatic group).

5. The colorant compound according to claim 4, wherein An⁻ is an aromatic carboxylate ion.

6. An ink comprising an aqueous medium and a colorant compound, wherein the colorant compound is a compound represented by the following general formula (1):

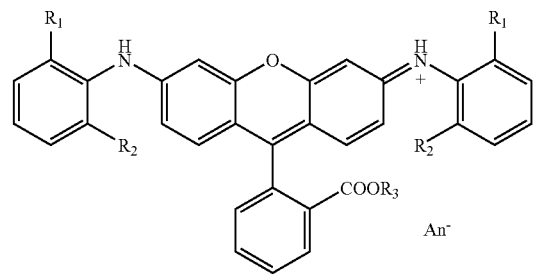

wherein $R_1$ and $R_2$ are the same or different from each other and denote a linear alkyl group having 1 to 4 carbon atoms, $R_3$ is an alkyl group having 1 to 6 carbon atoms, and An⁻ is a counter anion.

7. The ink according to claim 6, wherein $R_1$ and $R_2$ are methyl groups or ethyl groups.

8. The ink according to claim 6, wherein $R_3$ is a methyl group or ethyl group.

9. The ink according to claim 6, wherein An⁻ is at least one ion selected from the group consisting of halide ions, a sulfate ion ($SO_4^{2-}$), a perchlorate ion ($ClO_4^-$), a tetrafluoroborate ion ($BF_4^-$), a hexafluorophosphate ion ($PF_6^-$), a methacrylate ion ($CH_2C(CH_3)COO^-$), a p-toluenesulfonate ion ($CH_3C_6H_4SO_3^-$), fatty acid ions (R—COO⁻: R denotes an aliphatic group) and aromatic carboxylate ions (Ar—COO⁻: Ar denotes an aromatic group).

10. The ink according to claim 9, wherein An⁻ is an aromatic carboxylate ion.

11. The ink according to claim 6, which is an ink-jet ink.

12. An ink tank comprising an ink container part containing the ink according to claim 11.

13. A recording unit comprising an ink container part containing the ink according to claim 11 and a head part for ejecting droplets of the ink.

14. An ink-jet recording apparatus comprising the ink according to claim 11 and an ink-jet recording head for ejecting the ink.

15. An ink-jet recording process comprising the step of ejecting the ink according to claim 11 on a recording medium by an ink-jet system.

* * * * *

UNITED STATES PATENT AND TRADEMARK OFFICE
CERTIFICATE OF CORRECTION

PATENT NO. : 7,083,667 B2
APPLICATION NO. : 11/053267
DATED : August 1, 2006
INVENTOR(S) : Yasuaki Murai et al.

It is certified that error appears in the above-identified patent and that said Letters Patent is hereby corrected as shown below:

ON THE TITLE PAGE

Item (56), FOREIGN PATENT DOCUMENTS,

"JP 3-263524" should read --JP 03-263524--.

"JP 9-255882    9/1997" should be deleted.

COLUMN 5

Line 53, "exchange) Examples" should read --exchange). ¶ Examples--.

COLUMN 7

Line 5, "agents. is" should read --agents is--.

COLUMN 10

Line 58, "152,6" should read --152.6--.

COLUMN 12

Line 6, "ture)" should read --ture):--.

UNITED STATES PATENT AND TRADEMARK OFFICE
CERTIFICATE OF CORRECTION

| | |
|---|---|
| PATENT NO. | : 7,083,667 B2 |
| APPLICATION NO. | : 11/053267 |
| DATED | : August 1, 2006 |
| INVENTOR(S) | : Yasuaki Murai et al. |

It is certified that error appears in the above-identified patent and that said Letters Patent is hereby corrected as shown below:

<u>COLUMN 13</u>

Line 42, "that 5" should read --that--.

Signed and Sealed this

Thirteenth Day of May, 2008

JON W. DUDAS
*Director of the United States Patent and Trademark Office*